UNITED STATES PATENT OFFICE.

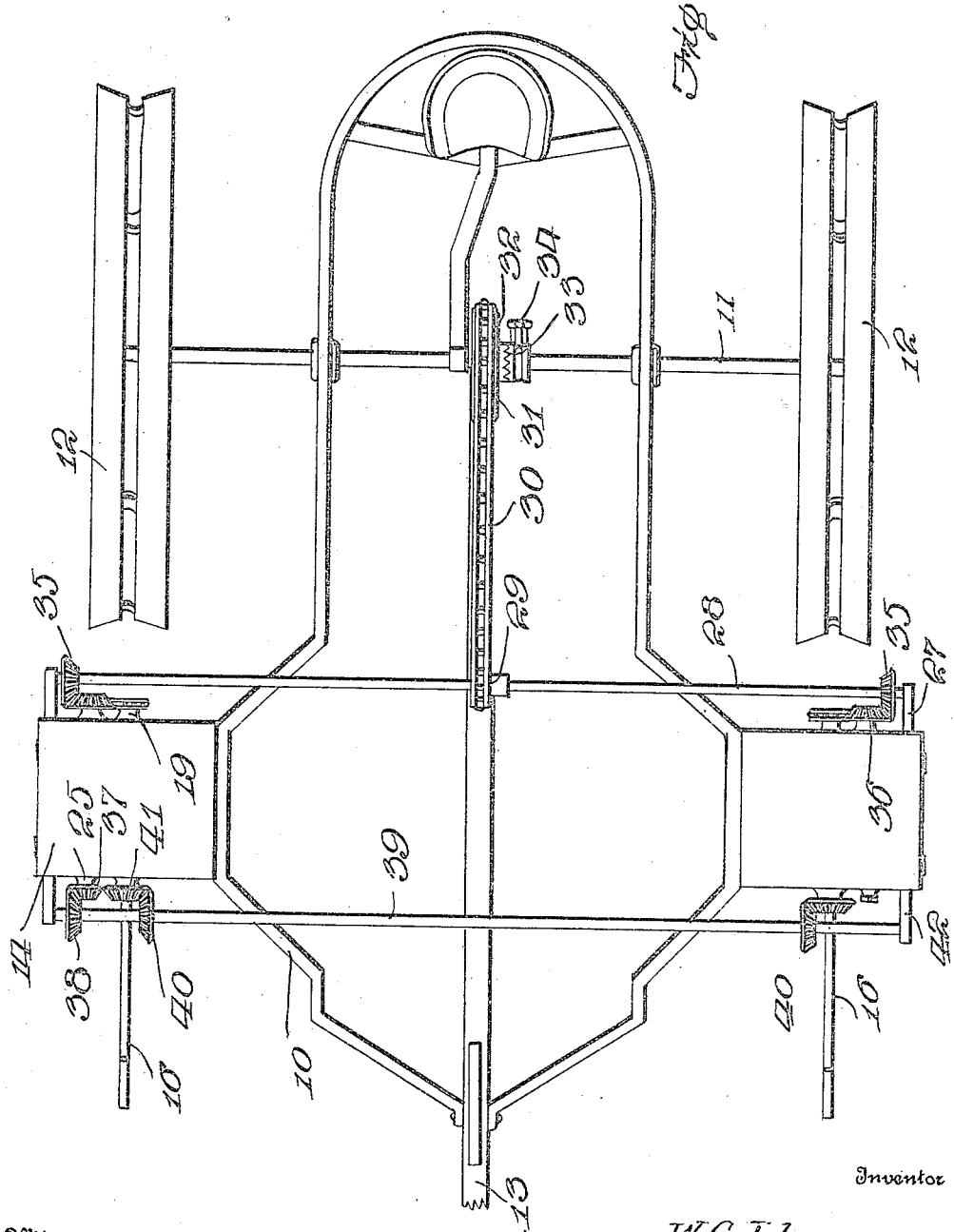

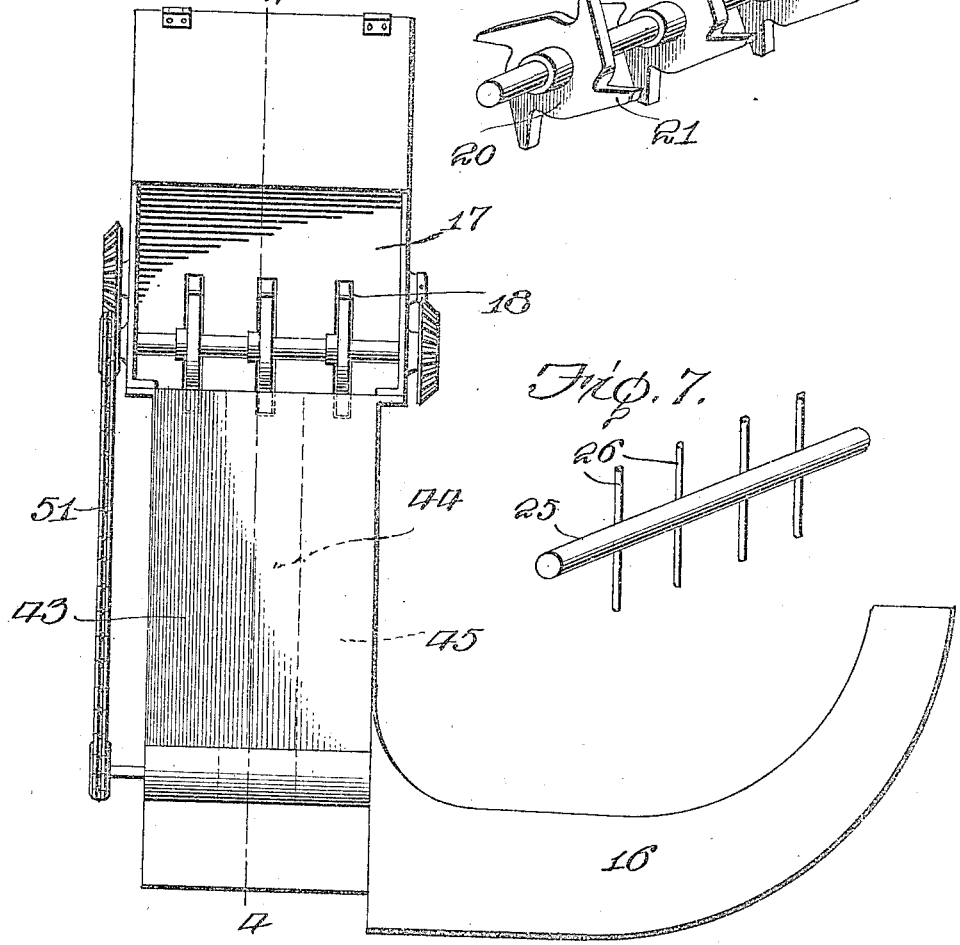

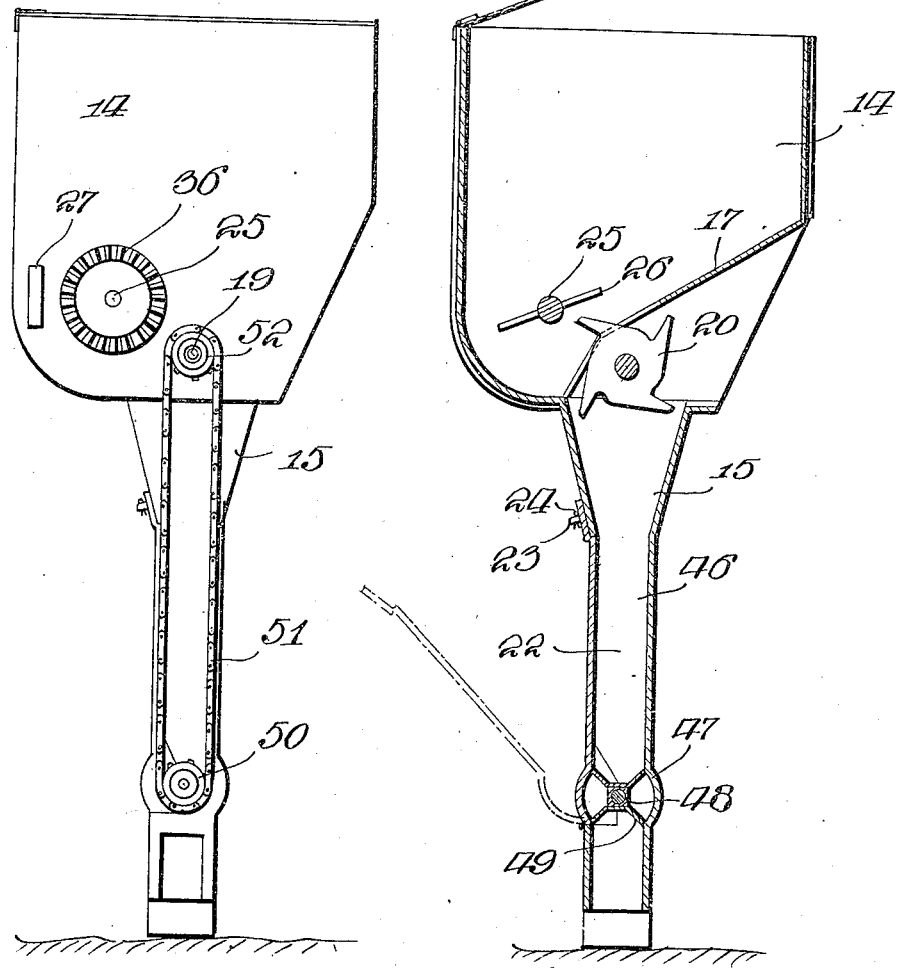
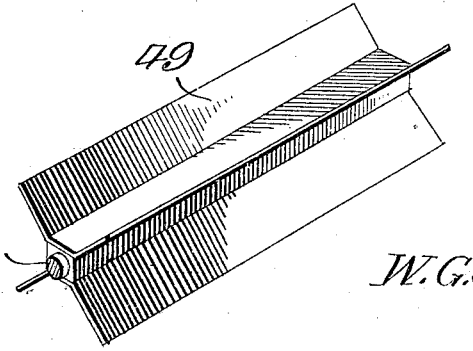

WILLIAM G. JOHNSON, OF KINGFISHER, OKLAHOMA.

PLANTER.

951,818.  Specification of Letters Patent. Patented Mar. 15, 1910.

Application filed June 21, 1909. Serial No. 503,560.

*To all whom it may concern:*

Be it known that I, WILLIAM G. JOHNSON, a citizen of the United States, residing at Kingfisher, in the county of Kingfisher and State of Oklahoma, have invented certain new and useful Improvements in Planters, of which the following is a specification.

This invention relates broadly to planters and refers particularly to an improved dropping mechanism employed in connection with the same.

The invention has for an object the provision of a mechanism which is adapted to drop the hills in rows at practically the instant the same are released so that an accurate gage may be had with respect to the positions of the hills during the operation and registering of the machine.

The invention has for another object the provision of means for effecting the above object which is operated by the movement of the planter and which necessitates the formation and employment of but practically no additional mechanism to planters which are now commonly employed.

The invention further contemplates the provision of an improved dropper which is located at the bottom of the chute, whereby the seed when released will fall instantly upon the ground and will thereby insure the correct gaging of the dropping of the hills with respect to the mechanism of the planter.

The invention still further aims at the provision of a mechanism of this character to which access can be easily gained to cleanse the same or to remove the seed should the same become clogged in the dropper.

For a full understanding of the invention reference is to be had to the following description and accompanying drawings, in which:—

Figure 1 is a top plan view of a planter having the improved dropping mechanism applied thereto. Fig. 2 is a side elevation of the inner side of one of the hoppers of the planter and the improved dropping mechanism applied thereto. Fig. 3 is a rear elevation of the same. Fig. 4 is a section on the line 4—4 of Fig. 2. Fig. 5 is a detailed perspective view of the improved dropper. Fig. 6 is a detailed perspective view of the feeders employed within the hopper, and Fig. 7 is a perspective view of the agitator employed in connection with the device.

Corresponding and like parts are referred to in the following description and indicated in all the views of the drawings by the same reference characters.

Referring to the drawings the numeral 10 designates the frame of the planter which is supported upon the main axle 11 and drive wheels 12, the latter being arranged upon the opposite extremities of the axle 11 outwardly of the sides of the frame 10. The forward end of the frame 10 is provided with a tongue 13 which is extended outwardly therefrom and is provided at its opposite sides rearwardly of the tongue 13 with a pair of hoppers 14. The hoppers 14 are of any improved construction and depend from the frame 10 where they terminate into chutes 15 which extend downwardly to a point immediately beyond the rear extremities of the runners or furrow openings 16. Each of the hoppers 14 is provided with a bottom 17 which is inclined upwardly and inwardly and which is provided with a plurality of slots 18 formed in equi-distant relation at the lower end of the bottom 17. The ends of the hopper 14 extend downwardly below the bottom 17 and form bearings for a stub shaft 19 which is longitudinally mounted beneath the bottom 17. Upon the shaft 19 are disposed a plurality of droppers or feeders 20, preferably three in number, which correspond to the number of slots 18 formed through the bottom 17, the droppers or feeders 20 being extended through the slots 18 and adapted for engagement with seed contained within the hopper 14. Each of the droppers comprises a circular member which is provided with fingers 21 extended tangentially from the periphery of the body portion 20 in order to form pockets or shoulders in which the seed are engaged during the rotation of the same in order to carry the seed through the slots 18 and outwardly of the bottom 17.

Arranged immediately beneath the hopper 14 is the chute 15, the same being of flattened formation and extended practically the entire length of the hopper 14 so as to convey the seed which is carried through the slots downwardly. The chute 15 is preferably formed of metal and is provided with a hinged leaf 22 at its outer side which is hinged adjacent the lower end of the chute 15 and secured at its upper end over a pin 23 which is apertured to receive a cotter-pin 24, or the like to retain the leaf 22 in an upward position. The leaf 22 forms the outer wall of the chute 15 and thereby admits of access to the interior of the chute upon opening the same.

Longitudinally arranged within the hopper 14 is an agitator or stirrer which comprises a stirrer shaft 25 which is journaled at its opposite ends through the ends of the hopper 14 adjacent the bottom 17 and the front wall of the hopper, the shaft 25 being provided with a plurality of oppositely extending fingers 26 arranged in staggered relation to the feeders or droppers 20 for the purpose of agitating the seed within the hopper and causing the same to engage fingers 21 of the feeders.

The hoppers 14 are each provided with rearwardly extending brackets 27 in the extremities of which is journaled a transverse shaft 28 extending across the frame 10 and provided intermediately with a sprocket 29 over which is passed a chain 30. The chain 30 extends rearwardly and engages over a large sprocket 31 mounted upon a sleeve 32 which is toothed at one end and which is loosely disposed about the main axle 11, the sleeve 32 being adapted for engagement with a second sleeve 33 which is keyed to the axle 11 to admit of the longitudinal movement only. The sleeve 33 is provided with oppositely formed teeth to coöperate with the teeth formed upon the sleeve 32 and is engaged with the sleeve 32 by the provision of a suitable operating lever 34. The transverse shaft 28 carries at its opposite ends beveled gears 35 which mesh with co-acting beveled gears 36 arranged upon the rear extremities of the stirrer shafts 25 which protrude beyond the hoppers 14. One of the stirrer shafts 25 is provided with a beveled pinion 37 which coöperates with a second beveled pinion 38 mounted upon one extremity of the operating shaft 39 transversely arranged across the frame 10 forwardly of the hoppers 14 for the purpose of imparting rotation to the operating shaft 39. Intermediately arranged upon the feeder shaft 39 are beveled gears 40 which mesh with beveled gears 41 disposed upon the forward extremities of the stub shafts 19 to thereby impart rotation to the same. The operating shaft 39 is preferably supported upon arms 42 forwardly extended from the hoppers 14 to support the shaft 39 adjacent the beveled gears 41.

The chute 15 is divided into three compartments 43, 44 and 45 which are formed by the provision of partitions 46 vertically arranged in order to correspond with the number of feeders or droppers 20 employed, and for the purpose of conducting individually the hills carried from the hopper 14 by the feeders or droppers 20. Positioned adjacent the lower end of each of the chutes 15 is an enlarged portion 47 which forms a circular chamber into which is inserted the improved dropper. The dropper comprises a stem 48 which is journaled in the opposite ends of the chute 15 to dispose the same in a horizontal position, and which is preferably of rectangular cross-section. From the opposite longitudinal edges of the stem 48, wings 49 are extended which engage snugly with the enlarged portion 47 of the chute to seal the passage between the upper and lower portions thereof. Each of the stems 48 is extended rearwardly beyond the wall of the chute 15 and provided with a sprocket wheel 50 over which is passed a chain 51 which extends upwardly and engages over a second sprocket wheel 52 mounted upon the rear extremity of each of the stub shafts 19. The chute 15 extends downwardly a slight distance below the enlarged portion 47 and terminates adjacent the ground immediately in the rear of the runners 16.

The operation of the device is as follows:—When the planter is moved forwardly and the sleeves 32 and 33 are engaged with one another the sprocket wheel 31 is rotated and imparts rotation to the transverse shaft 28 through the medium of the sprocket wheel 29 and the chain 30. This motion is transmitted to the beveled gears 35 and 36 whereby the stirrer shaft 25 is rotated to cause the fingers 26 to revolve and to stir the seed within the hoppers 14 to cause the same to fall forwardly against the bottoms 17. During this operation the beveled pinion 37 actuates the pinion 38 to cause the rotation of the operating shaft 39. The shaft 39, through the medium of the gears 40 and 41, sets the stub shaft 19 in motion to cause the action of the feeders or droppers 20. As the feeders or droppers 20 are revolved the fingers 21 are consecutively engaged through the slots 18 and caused to collect a number of the seeds disposed within the hoppers 14 and to carry the same through the slots 18 to thereby admit of the falling of the same into the respective compartments 43, 44 and 45 of the chute. As the stub shafts 19 are revolved the chains 51 are actuated to cause the rotation of the stems 48 to carry the wings 49 about the interior of the enlarged portions 47. As the wings 49 are four in number in each of the hoppers it is readily observed that four hills will be dropped from each of the chutes 15 upon the complete revolution of each of the droppers. Moreover it is seen that the passageway between the upper portions of the chutes 15 and the lower ends thereof are always closed so that the seed is fed only at predetermined intervals regulated by the speed of the droppers.

The leaves 22 of the chutes 15 can be swung outwardly when it is desired to gain access to the droppers or to the interior of the chutes.

Having thus described the invention what is claimed as new is:—

1. A device as specified comprising a hopper, a chute depending from said hopper, partitions arranged in said chute to form vertical compartments therein, feeders disposed through the bottom of said hopper over each of the compartments, stirrers mounted in said hopper, means for actuating said stirrers and said feeders and a dropper located intermediately within said chute.

2. A device as specified comprising a hopper, a chute depending from said hopper, a plurality of partitions vertically disposed in said chute, feeders mounted above said chute and extended into said hopper, means for actuating the feeders, a stem horizontally mounted intermediately of said chute, a plurality of wings radially extended from said stem to form a plurality of compartments and means for actuating said stem.

3. A device as specified comprising a hopper, an inclined bottom disposed in said hopper and having a plurality of slots formed therein, a stub shaft disposed beneath said bottom, a plurality of feeders mounted on said stub shaft and extended through said bottom for engagement with seed in the hopper, a stirrer shaft mounted within said hopper above said bottom, a plurality of arms outwardly extended from said stirrer shaft between said feeders, a train of gears connected to said stub shaft and to said stirrer shaft for actuating the same, a chute depending from said hopper beneath said feeders, an enlarged portion formed in the lower end of said chute, a stem journaled in said enlarged portion, a plurality of wings radially extended from said stem and means disposed between said stub shaft and said stem for actuating the same.

4. A device as specified comprising a planter, a transverse shaft mounted on said planter, hoppers carried by said planter, stirrers mounted in said hoppers and connected to said transverse shaft, feeders mounted in said hoppers, gears disposed between said feeders and said stirrer to actuate said feeders, chutes depending from said hoppers, droppers mounted in the lower ends of said chutes and means disposed between said droppers and said feeders for actuating said droppers.

5. A planter including a hopper, a slotted bottom disposed in said hopper, a stub shaft arranged beneath said bottom, a plurality of feeders mounted on said stub shaft and extended through said bottom to engage seed, a stirrer shaft mounted in said hopper, above said bottom and a plurality of arms radially extended from said stirrer shaft, a chute depending from said hopper, an enlarged portion formed in the lower end of said chute, a stem journaled in said enlarged portion, a plurality of wings radially extended from said stem, and a train of gears connected to said shafts and said stem for actuating the same.

In testimony whereof I affix my signature in presence of two witnesses.

WILLIAM G. JOHNSON. [L. S.]

Witnesses:
   MILO A. BULL,
   H. E. FULTON.